March 5, 1968  G. H. DUMAS  3,371,533
APPARATUS FOR MEASURING THE LEVEL OF CRYOGENIC LIQUIDS
Filed Feb. 15, 1965

United States Patent Office 3,371,533
Patented Mar. 5, 1968

3,371,533
APPARATUS FOR MEASURING THE LEVEL OF CRYOGENIC LIQUIDS
Guy H. Dumas, Paris, France, assignor to Société Industrielle de Liaisons Electriques, Paris, France, a company of France
Filed Feb. 15, 1965, Ser. No. 432,627
Claims priority, application France, Feb. 25, 1964, 964,990
2 Claims. (Cl. 73—295)

ABSTRACT OF THE DISCLOSURE

A method and apparatus for indicating a fall or rise in the level of a liquefied gas such as helium or hydrogen utilizing a thermo-sensitive semi-conductor body as the probe. The semi-conductor body is doped with impurities to produce a resistivity between about $1/100$ and some $1/1000$ of an ohm-centimeter at room temperature. The semi-conductor body is then immersed into the liquid and an electric current is passed through the semi-conductor by a constant voltage source to heat same to a temperature below the boiling point of the liquid. As the liquid level falls beneath the position of the semi-conductor body, a sharp increase in current is measured indicating the fall of the liquid, the increase in current being enhanced by a thermo-avalanche effect due to the characteristics of the semi-conductor body.

---

This invention relates to a method of and apparatus for measuring the level of cryogenic liquids. The invention applies to all fluids having a boiling temperature below 100° K. at normal atmospheric pressure, and it relates more particularly to the measurement of the levels of liquids having the lowest boiling temperatures, such as helium (4° K.) and hydrogen (20° K.).

To measure the level of a liquid the method according to the invention makes use of the difference in thermal conductivity between the liquid and its vapour or between the liquid and a surrounding gas.

Level gauges using the same principle have already been proposed but their application is limited to substances which are liquid at temperatures of a normal low level, because the thermo-sensitive elements or "thermistors" which they contain have a very high resistivity at very low temperatures and to retain adequate sensitivity such elements have to be supplied with relatively high voltages, for example several hundreds of volts, which is undesirable for measuring or control equipment.

A principal object of the invention is to provide an improved apparatus for measuring the level of cryogenic liquids.

Another object of the invention is to provide a level gauge having a very short response time which can supply the required result in a fraction of a second. This may be very advantageous in the case of rapid level variations.

The method according to the invention comprises introducing into the container containing the cryogenic liquid whose level is to be gauged, at least one small-volume semi-conductive thermosensitive element having a relatively low resistivity at very low temperatures, the said resistivity decreasing rapidly when the temperature increases, with a thermal "boom" effect as from a specific temperature of the said element, the said method also comprising supplying the said element with a substantially constant voltage so selected depending upon the nature of the liquid whose level it is required to gauge and the volume and resistivity of the said element, that the said specific temperature lies between the temperature assumed by the said element when it is immersed in the liquid and the temperature assumed by the same element when it is above the level of the liquid in the vapour phase, the said method finally comprising measuring the intensity of the current through the said element and deriving from such measurement the position of the said element with respect to the level of the liquid.

According to the invention, when an electric current delivered at a substantially constant voltage passes through the thermo-sensitive element the latter assumes an equilibrium temperature in the liquid because of the heat produced by the current and the heat dissipated by thermal conduction in the cryogenic liquid. If the element passes from the liquid to its vapour, the cooling it undergoes decreases because of the difference in thermal conduction and as its resistance decreases under the temperature increase the supply current increases and this further increases the heat supplied. As from a specific current (hence for a given supply voltage) there is a thermal boom so that the voltage-current characteristic of the element has an abrupt bend or threshold beyond which the current increases very rapidly thus showing the level separating the two fluids.

The thermo-sensitive element of a level gauge according to the invention has a sufficiently low resistivity and sufficiently small dimensions for the above boom effect to occur for a low supply voltage, for example a few volts, despite the very low temperatures required, and this enables rapid and exact measurements to be carried out with a very low energy dissipation. According to the invention, the thermo-sensitive element used is a semi-conductive substance selected from Groups III/V, II/VI and IV/IV suitably doped to give a low resistivity at ordinary temperature, for example about $1/100$ to some thousandths of an ohm. Thus, the thermo-sensitive element may advantageously be formed from a small bar of silicon doped with boron, whose resistivity at ordinary temperature is 0.017 ohms approximately.

In a fixed installation it is convenient to dispose a plurality of thermo-sensitive probes at different specific heights to give immediate and permanent readings of the level. In other installations a probe may be provided to correspond to the minimum level below which the level must not fall and another probe corresponding to the maximum level so as to control a filling or similar system.

The invention will be more readily understood from the following detailed description and the accompanying drawings, which illustrate one exemplified embodiment of the invention.

Figure 1:
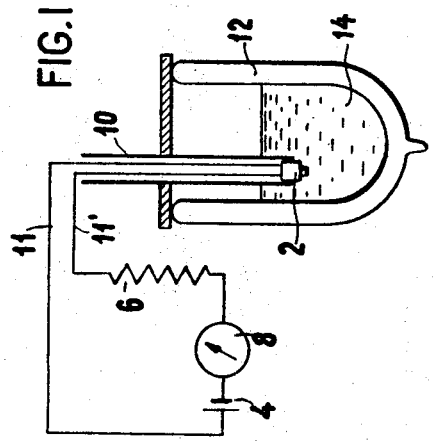
FIGURE 1 is a diagrammatic view of an apparatus according to the invention.

The gauge shown diagrammatically in FIGURE 1 comprises a heat-sensitive element 2 formed by a small boron-doped silicon bar prepared by the Czochralski method. The dimensions of this element are very small so as to improve the heat exchange and reduce resistance, so that good results are obtained with a bar of a length of 2 mm., a width of 0.6 mm. and a thickness of 60 microns. This element is soldered, for example with a eutectic gold solder containing 0.5% of gallium and 30% of silicon, to the connections of a case of the kind used for mounting transistors, the contacts advantageously being purely ohmic. The thermo-sensitive element and case assembly which will hereinafter be referred to as a "probe" may have the shape of a cylinder of the following external dimensions: diameter about 4 mm., height about 6 mm.

The element is connected to a supply circuit containing a voltage source 4 at a substantially constant voltage, an ammeter 8 and, if required, a limiting resistor 6.

By way of example, in a specific embodiment applicable to level measurements in helium, a supply voltage of about 2.2 volts and a limiting resistance of about 100 to 1,000 ohms were used.

The case of the element is secured to a support 10 formed, for example, by a stainless steel tube inside which extends the current supply leads 11-11', so that the probe can be lifted or lowered in a container 12 containing a cryogenic liquid 14, e.g., helium.

Figure 2:
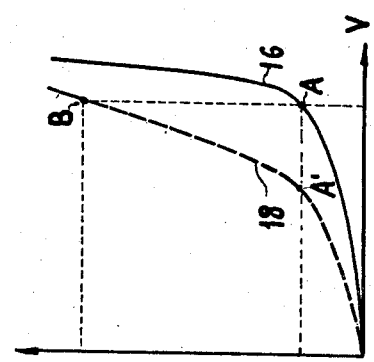
FIGURE 2 is a curve showing the variation of the currents passing through the thermo-sensitive element in dependence on the supply voltages, depending upon whether the element has been immersed in the liquid or its vapour.

When the thermo-sensitive element is immersed in liquid helium, the variation of the current in microamperes in dependence on the voltage in volts is as shown by the curve 16 in FIGURE 2, which shows the above-mentioned thermal boom, which occurs substantially as from the point A, for a voltage of about 2 volts. Beyond this bend the resistance of the element decreases very rapidly.

Curve 18 in the same graph shows the current/voltage variation of the same element when the latter is situated in the immediate vicinity of the liquid level in the helium vapour phase. Because of the difference in thermal conduction between the liquid and vapour, the point A' of the curve 18 appears at a substantially lower voltage than previously, so that for this previous voltage the operating point in the vapour is situated at the point B corresponding to a current 10 to 30 times greater (i.e., about 2 to 6 ma.) than the current flowing through the element when the latter is immersed in the liquid. The indications of the ammeter 8 thus give a very exact measurement of the level of the liquid and the accuracy can be of the order of thickness of the bar, i.e., some tens of microns.

The resistance variation of the bar is between about 100 ohms and about 10,000 ohms depending upon whether it is in the vapour or the liquid.

It will be apparent that with the invention the power dissipated by the gauge at very low temperatures is very low and that because of the sensitivity of the probe with its small dimensions the response time can be extremely small and, for example, of the order of a fraction of a second.

Figure 3:
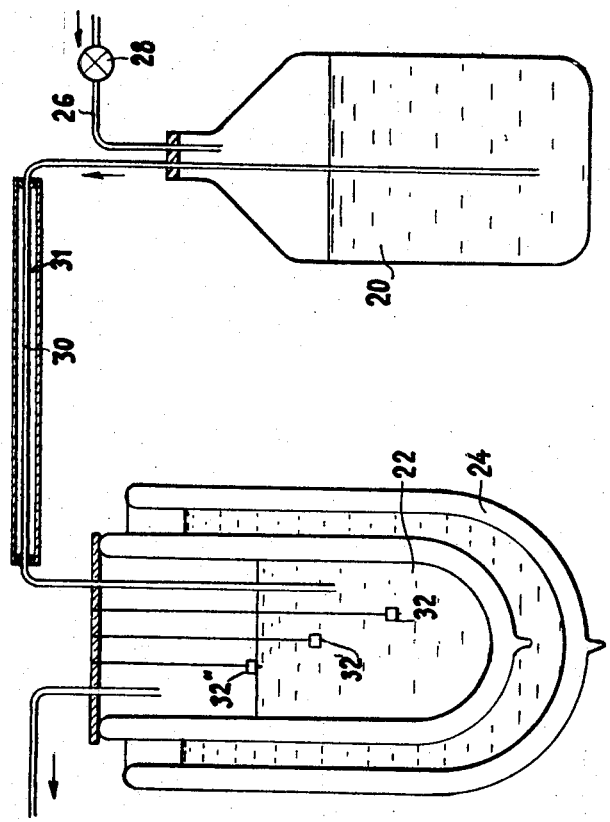
FIGURE 3 shows an installation employing the level gauge according to the invention.

FIGURE 3 shows an example of a filling installation for liquid helium containing level gauges according to the invention.

The liquid helium contained in a tank 20 is transferred to a Dewar vessel 22 which is to be filled to a specific level. As is conventional, the vessel 22 is housed in a second vessel 24 filled with liquid nitrogen and the transfer is carried out by the introduction of gaseous helium under pressure into the tank 20 by means of a pipe 26 containing a valve 28. The transfer tube 30 is housed in a vacuum tube 31 which insulates it thermally. A number of probes 32, 32', 32" according to the invention, are disposed in fixed positions at different heights in the vessel 22 and detect the level of the liquid helium in the vessel. Of course, the control of the valve 28 can be subject in known manner to the control ammeters (not shown) which detect the current variation taking place in the probes depending upon whether the latter are in the liquid or the vapour.

The invention is naturally not limited to the above-described example as illustrated in the drawings and may be modified in various ways familiar to those versed in the art, depending upon the required applications, without thereby departing from the scope of the invention.

What is claimed is:

1. Apparatus for measuring the level of a liquefied gas having a boiling temperature below about 20° K. in a container comprising:
   a thermo-sensitive element consisting of a boron doped silicon bar having a thickness of the order of tens of microns and a surface area of about 1 to 10 square mm.;
   support means for the thermo-sensitive element;
   a constant voltage source;
   a meter and
   means coupling the voltage source and the thermo-sensitive element through the meter for measuring the flow of current through the thermo-sensitive element;
   said thermo-sensitive element having a low resistivity at very low temperatures, said resistivity decreasing rapidly at higher temperatures with a thermal boom effect at a specific temperature of the element and the value of the voltage at the constant voltage source being selected according to the nature of the liquid whose level it is required to gauge, and the volume and resistivity of the said element, so that the said specific temperature lies between the temperature assumed by the element when immersed in said liquid and the temperature assumed by the same element when it is situated in the vapour phase, above the level of said liquid.

2. Apparatus according to claim 1 wherein said thermal boom effect takes place with a supply voltage of the order of a few volts at an ambient temperature below about 20° K.

References Cited

UNITED STATES PATENTS 2,860,219  11/1958  Taft et al. ———————— 338—22 X
3,222,578  12/1965  Thiele ———————————— 338—22 X

OTHER REFERENCES

Lork-Horovitz Electrical Engineering, December 1949, vol. 68, No. 12, TK 1 A61.

LOUIS R. PRINCE, *Primary Examiner.*

S. C. SWISHER, *Assistant Examiner.*